United States Patent
Lettkeman et al.

(10) Patent No.: US 10,662,114 B2
(45) Date of Patent: May 26, 2020

(54) ULTRA-LIGHT CEMENTITIOUS COMPOSITIONS AND RELATED METHODS

(71) Applicant: United States Gypsum Company, Chicago, IL (US)

(72) Inventors: Dennis Mark Lettkeman, Tulsa, OK (US); John Wesley Wilson, Fairview, OK (US); William Kelly Bedwell, Okeene, OK (US); Gary Franklin Miller, Palatine, IL (US); Raymond A. Kaligian, Geneva, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/959,571

(22) Filed: Apr. 23, 2018

(65) Prior Publication Data

US 2018/0237341 A1     Aug. 23, 2018

Related U.S. Application Data

(62) Division of application No. 14/268,557, filed on May 2, 2014, now Pat. No. 9,975,808.

(51) Int. Cl.
| | |
|---|---|
| C04B 28/14 | (2006.01) |
| C04B 38/10 | (2006.01) |
| E04F 15/12 | (2006.01) |
| C04B 111/00 | (2006.01) |
| C04B 111/60 | (2006.01) |
| C04B 111/80 | (2006.01) |

(52) U.S. Cl.
CPC ............ C04B 28/14 (2013.01); C04B 38/106 (2013.01); E04F 15/12 (2013.01); C04B 2111/0062 (2013.01); C04B 2111/00068 (2013.01); C04B 2111/60 (2013.01); C04B 2111/802 (2013.01)

(58) Field of Classification Search
CPC ............... C04B 28/14; C04B 38/106; C04B 2111/00068; C04B 2111/0062; C04B 2111/60; C04B 2111/802; E04F 15/12
See application file for complete search history.

(56) References Cited

U.S. PATENT DOCUMENTS

| | | | |
|---|---|---|---|
| 4,042,745 A | 8/1977 | Cornwell et al. | |
| 4,077,809 A | 3/1978 | Plunguian et al. | |
| 5,250,578 A | 10/1993 | Cornwell | |
| 5,453,310 A | 9/1995 | Andersen et al. | |
| 5,543,186 A | 8/1996 | Andersen et al. | |
| 5,654,048 A | 8/1997 | Andersen et al. | |
| 5,714,446 A | 2/1998 | Bartz et al. | |
| 6,641,658 B1 | 11/2003 | Dubey | |
| 6,869,474 B2 | 3/2005 | Perez-Pena et al. | |
| 7,052,543 B2 | 5/2006 | Nguyen et al. | |
| 7,670,427 B2 | 3/2010 | Perez-Pena et al. | |
| 7,849,648 B2 | 12/2010 | Tonyan et al. | |
| 8,038,790 B1 | 10/2011 | Dubey et al. | |
| 8,065,853 B2 | 11/2011 | Tonyan et al. | |
| 8,069,633 B2 | 12/2011 | Tonyan et al. | |
| 8,070,878 B2 | 12/2011 | Dubey | |
| 8,277,556 B2 | 10/2012 | Berke et al. | |
| 8,298,332 B2 | 10/2012 | Dubey | |
| 8,519,016 B2 | 8/2013 | Perez-Pena | |
| 2007/0048490 A1 | 3/2007 | Yu et al. | |
| 2008/0057206 A1 | 3/2008 | Igo et al. | |
| 2008/0099122 A1 | 5/2008 | Andersen | |
| 2010/0071597 A1 | 3/2010 | Perez-Pena | |
| 2012/0148806 A1 | 6/2012 | Dubey et al. | |
| 2012/0167804 A1 | 7/2012 | Perez-Pena | |
| 2012/0312193 A1 | 12/2012 | Jezequel et al. | |
| 2012/0322904 A1 | 12/2012 | Fisher | |
| 2013/0284069 A1 | 10/2013 | Dubey | |
| 2013/0326985 A1 | 12/2013 | Lichtinger et al. | |
| 2016/0122247 A1 | 5/2016 | Daniels et al. | |

FOREIGN PATENT DOCUMENTS

| | | | |
|---|---|---|---|
| CN | 103375001 A | * | 10/2013 |
| DE | 102010048339 A1 | | 3/2012 |
| SU | 423765 | | 9/1974 |

* cited by examiner

*Primary Examiner* — Anthony J Green
(74) *Attorney, Agent, or Firm* — Greer, Burns & Crain, Ltd.; Philip Petti; Pradip Sahu

(57) ABSTRACT

An ultra-light, pourable, self-drying cementitious product with improved density control and ultra-low water demand is provided. Compositions and methods for making the products are provided as well, including compositions and methods with ultra-low water demand.

4 Claims, 1 Drawing Sheet

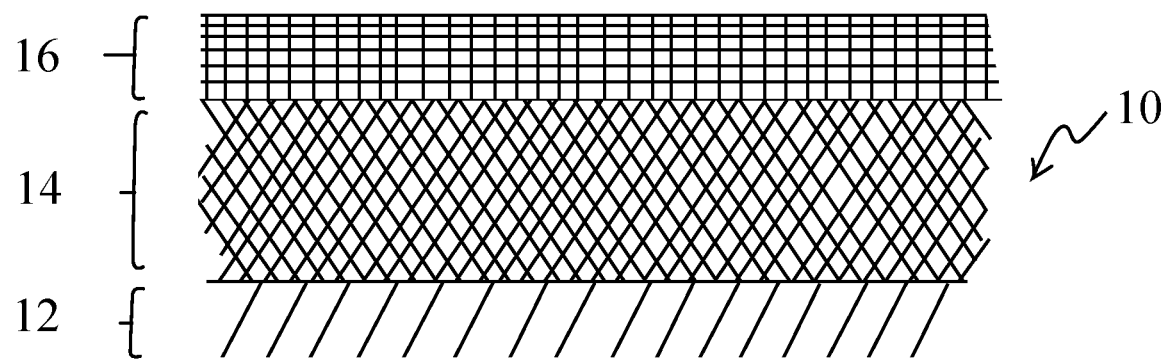

ULTRA-LIGHT CEMENTITIOUS COMPOSITIONS AND RELATED METHODS

This application is a divisional patent application of U.S. patent application Ser. No. 14/268,557, filed May 2, 2014, now issued as U.S. Pat. No. 9,975,808, the entire disclosure of which is herein incorporated by reference.

FIELD OF THE INVENTION

This invention provides compositions and methods for construction of ultra-light pourable items such as doors, wall panels, garage door panels, wall partition systems, ceiling panels, gun safes, file cabinets and other fire rated applications, and flooring and the like. The invention also relates to ultra-light cementitious compositions with improved density control and even distribution of filling material. Methods for making such compositions are also provided. This invention also provides formulations which can be utilized at ultra-low water demands.

BACKGROUND

Various poured products including flooring, wall panels, garage door panels, ceiling tiles/panels and doors are used in residential and commercial construction. The poured products are often based on Portland cement and/or gypsum in part because it is desirable to obtain floor and wall or other assemblies which are fire and sound rated. Pourable cementitious compositions known in the art comprise powdered cement and/or gypsum based material, silica sand and/or other types of fillers and water. These materials are either bucket mixed or mechanically mixed. The resultant slurries are poured into forms or cavities or pumped on to various substrates.

Poured products, especially flooring, have to meet certain requirements for compressive strength, which can be achieved with conventional cementitious, calcium sulfate hemi-hydrate or combination compositions, but such compositions are heavy and they can take several days to set and dry. Further, it is desirable to obtain pourable products with good sound isolation, which can be achieved by including porous filling material, also known as a filler. Fillers include expanded perlite.

However, there remains a need in the field for pourable cementitious compositions with improved density control so that a filling material remains evenly distributed through the depth of a poured product while the product is setting. There also remains a need for pourable cementitious products which are light and also meet the compressive strength and fire resistance requirements. In addition there remains a need for a pourable cementitious and/or gypsum combination with low water demand and which dries at a faster rate than conventional combinations. Finally, there is a need for pourable cementitious products which have a quicker turn-around time for serviceability and/or use, including without limitation, a quicker turn-around time before the surface can be walked upon or a mold can be removed.

SUMMARY

At least some of these needs are addressed by improved pourable, ultra-light cementitious products with even distribution of filling material and excellent fire resistance as disclosed in this specification. One embodiment provides an ultra-light cementitious composition which includes 60% to 80% of a 50:50 combination of cement and gypsum component; 0.1% to 10% of a surfactant mixture of at least one anionic surfactant and at least one nonionic surfactant; and water; wherein the ratio of water to dry components is in the ultra-low range from 0.17 to 0.30.

One embodiment provides an ultra-light cementitious composition comprising 60% to 80% of a 50:50 combination of cement and gypsum component; 1% to 30% of a filler selected from the group consisting of coated perlite, uncoated perlite, shale, borosilicate glass spheres, expanded polystyrene balls (EPS) and any combination thereof; 0.1% to 10% of a surfactant mixture of at least one anionic surfactant and at least one nonionic surfactant and water. At least in some embodiments, the surfactant mixture comprises sodium laureth sulfate, sodium lauryl sulfate and alkyl dimethyl amine oxide. Ultra-light cementitious compositions with low water demand are provided as well. The water demand is defined as the total weight of the water divided by the weight of the dry components. Such compositions include those in which the ratio of water to dry components is in the range from 0.17 to 0.30.

Further embodiments provide a fire-rated, ultra-light pourable product with the compressive strength in the range from 75 to 230 psi and comprising a cementitious core which is formulated with components including cement, calcium hemi-hydrate, a filler, an anionic/nonionic surfactant mixture and superplasticizer. The pourable products include doors, wall panels, garage door panels, wall partition systems, ceiling panels, gun safes and file cabinets.

Other embodiments provide methods by which fire-resistant, ultra-light cementitious products with controlled density are produced. At least some of these products are pourable and self-leveling. These products are fast drying and are serviceable soon after they are poured.

BRIEF DESCRIPTION OF THE DRAWINGS

The FIGURE depicts self-leveling flooring prepared with an ultra-light cementitious composition.

DETAILED DESCRIPTION

Compositions and methods are provided for construction of pourable items such as doors, wall panels, garage door panels, ceiling tiles and panels, flooring, gun safes, file cabinets and other fire rated applications and the like. The compositions are much lighter in comparison to regular pourable compositions made for similar use.

Many construction materials, such as for example wallboard, comprise gypsum which is comprised of calcium sulfate dihydrate and which can be produced by setting a hydration reaction with calcium sulfate hemihydrate. Different forms of calcium sulfate hemihydrate are suitable, including calcium sulfate hemihydrate obtained by calcining calcium sulfate dihydrate; synthetic calcium sulfate hemihydrate, chemically modified calcium sulfate hemihydrate, calcium sulfate α-hemihydrate, calcium sulfate β-hemihydrate and combinations thereof.

In some embodiments, ultra-light cementitious compositions comprise a combination of cement and a gypsum component which comprises at least one of the following: calcium sulfate dihydrate; calcium sulfate anhydrite; calcium sulfate hemihydrate, including natural, synthetic or chemically modified calcium sulfate hemihydrate; calcium sulfate α-hemihydrate, calcium sulfate β-hemihydrate and combinations thereof.

Various types of cement can be used, including without limitation, Portland cement. Various grades of Portland cement can be used, including without limitation preferred cements such as: Class C, Type II and Type V Portland cements (white, gray or a combination thereof). Other suitable cements may include, but are not limited to, calcium sulfo-aluminate cement, magnesium based cement, calcium aluminate cement, and mixtures thereof. At least in some embodiments, cement is cooked and/or ground cement.

At least in some embodiments, the ratio between the gypsum component and cement is 50:50. Other acceptable ratios for the gypsum component to cement include from about 15:85 to about 60:40.

At least some compositions include from 40 to 90% of the gypsum component and cement. At least in some other compositions the total percentage of the gypsum component and cement is from 50 to 80%. At least in some compositions the total percentage of the gypsum component and cement is at about 75%. At least in some embodiments, an ultra-light self-drying composition can be prepared with a combination of white and gray cement and calcium sulfate hem i-hydrate.

An ultra-light self-drying composition can be prepared with a combination of white and gray cement and calcium sulfate hem i-hydrate at a ratio of calcium sulfate hem i-hydrate to cement of 75% to 25% respectively, and wherein the 25% is up to ½ of white and gray cement. The term "self-drying" includes compositions which absorb water such that there is no need for water to evaporate when compositions are poured and solidifying. These compositions with gray and white cements are preferred because they create a self-drying ultra-low water material which has unexpectedly controlled expansion, extremely high strength and controllable setting action while being self-leveling. In further embodiments, a composition can be further mixed with a filler such as, but not limited to, perlite and the resultant material unexpectedly has expansions similar to the original composition and remains self-drying, while exhibiting much lower controllable density. A variety of products can be obtained from a composition comprising calcium sulfate hemi-hydrate and white and grey cement, including doors, wall panels, garage door panels, wall partition systems, ceiling panels, gun safes and file cabinets and self-drying flooring with self-leveling tendencies.

An ultra-light cementitious composition may include at least one type of filling material or a filler. Such fillers include, but are not limited to, expanded coated and uncoated perlite, shale (light weight clay), borosilicate glass spheres, light weight fly ash and expanded polystyrene balls (EPS balls). The amount of a filler may vary depending on the physical characteristics to be achieved in the final pourable product. In at least some embodiments, from 1% to 5% of a filler is used. In other embodiments from 1% to 15% of a filler is used. In some embodiments from 1% to 25% of a filler is used. In some embodiments from 15% to 30% of a filler is used. In some embodiments from 1% to 30% of a filler is used.

In some embodiments, a pourable ultra-light cementitious composition may include a superplasticizer, which permits reducing the amount of water needed for preparing a pourable slurry from an ultra-light cementitious composition. Suitable superplasticizers include, but are not limited to, sulphonated naphthalene aldehyde condensates, sulphonated melamine formaldehyde condensates, lignosulfonates and polycarboxylic compounds such as polyacrylates. At least in some embodiments, a superplasticizer is a polycarboxylic ether. Suitable superplasticizers include ADVA Cast by Grace Construction Products, Cambridge, Mass., DILOFLO GW Superplasticizer of Geo Specialty Chemicals, Cedartown, Ga. and various modified polycarboxylic ether superplasticizers such as for example, MELFLUX superplasticizers from BASF Construction Polymers GmbH, Germany.

At least in some embodiments, an ultra-light cementitious composition also includes a surfactant which can be selected from anionic, non-ionic, cationic, amphoteric surfactants and mixtures thereof. Suitable anionic surfactants include, but are not limited to, sulfonate or sulfate surfactants such as for example an alkyl sulfonate, an alkyl ether sulfonate, a hydroxyalkyl ether sulfonate, an alpha olefin sulfonate, an alkyl benzenesulfonate, an alkyl sulphate, an alkyl ether sulphate, a hydroxyalkyl ether sulphate, an alpha olefin sulphate and an alkyl benzenesulphate, an alcohol ethoxysulfate, an alcohol sulfate or a mixture thereof. Particularly suitable anionic surfactants include sodium laureth sulfate and sodium lauryl sulfate and a mixture thereof. Suitable non-ionic surfactants include, but are not limited to, various amine oxides and particularly amine oxides with a long-chain alkyl. Such long-chain alkyl groups include those with 10 to 18 carbon atoms. A particularly suitable amine oxide includes alkyl dimethyl amine oxide with 10-16 carbon atoms.

Unexpectedly, the inventors have discovered that a mixture of at least one anionic surfactant with at least one nonionic surfactant provides a significant improvement in density control of a resulting ultra-light cementitious composition. A particularly preferred mixture of surfactants includes a mixture of sodium laureth sulfate, sodium lauryl sulfate and alkyl dimethyl amine oxide. The ratios between different surfactants may vary depending on the density that needs to be achieved in the resulting ultra-light cementitious composition.

In some embodiments, an anionic/nonionic mixture suitable for preparing an ultra-light cementitious composition includes surfactant mixtures described in Table 1.

TABLE 1

| Component | Suitable Range | Preferred Range |
| --- | --- | --- |
| Ethyl Alcohol | 0.1-1% | 1-5% |
| Alcohol Ethoxysulfate, sodium salt (Sodium Laureth Sulfate) | 10-30% | 10-30% |
| Alcohol Sulfate, sodium salt (Sodium Lauryl Sulfate) | | |
| Amines, C10-16, alkyldimethyl, N-oxides (Alkyl Dimethyl Amine Oxide) | 1-5% | 3-7% |
| Water and/or other suitable solvents | Up to 100% | Up to 100% |

Table 1 includes various anionic/nonionic surfactant mixtures, including mixtures commercially available under the trade name DAWN, including DAWN as shown in column "Suitable Range." Table 1 also includes a mixture available under the trade name DAWN-ULTRA, including DAWN-ULTRA and as shown in column "Preferred Range" of Table 1.

In some embodiments, an ultra-light cementitious composition comprises from 0.1 to 10% of a surfactant mixture of Table 1. In some embodiments, an ultra-light cementitious composition comprises from 0.1 to 5% of a surfactant mixture of Table 1. At least in some embodiments, an ultra-light cementitious composition comprises from 0.5 to 2% of a surfactant mixture of Table 1.

The inventors have discovered that a surfactant mixture of at least one anionic surfactant with at least one nonionic surfactant, including a mixture according to Table 1, provides a foamed matrix in an ultra-light cementitious composition. Unexpectedly, the foamed matrix keeps an ultra-light cementitious composition homogenous with filler particles evenly distributed in the foamed matrix. Further, it was also unexpectedly discovered that the use of an anionic/nonionic surfactant mixture prevents movement of filler particles in the foamed matrix after the composition is poured and is setting. Therefore, the quality of a resulting poured product is improved as shifting of filler particles during setting is minimized and even distribution is maintained. Furthermore, it was unexpected that a mixture made utilizing the liquid mix from TABLE 1 produced a hardened matrix which contains ultralow amounts of unconsumed water after hydration.

An ultra-light cementitious composition may include set control additives such as those that either accelerate or retard a setting time of an ultra-light cementitious composition. One or more set controlling additives may be added to an ultra-light cementitious composition. Suitable set control additives may include, but are not limited to, organic compounds such as hydroxylated carboxylic acids and sugars. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, trihydroxy benzoic acid, etc. may also be useful. Salts of organic acids such as sodium citrate, potassium citrate, sodium tartrate, potassium tartrate, sodium gluconate may also be used as set control agents in some embodiments. Inorganic acid based set control agents of the type boric acid and suitable salts thereof (borates) may also be suitable for some embodiments.

Other optional set control chemicals include sodium carbonate, potassium carbonate, calcium nitrate, calcium nitrite, calcium formate, calcium acetate, calcium chloride, lithium carbonate, lithium nitrate, lithium nitrite, aluminum sulfate, potassium sulfate, sodium aluminate, alkanolamines, and polyphosphates.

Particularly suitable set accelerators include calcium sulfate dihydrate also known as Calcium Sulfate Accelerator (CSA) and Heat Resistant Accelerators (HRA) disclosed in U.S. Pat. No. 7,718,019, incorporated herein as a whole by reference.

In some embodiments, a hydration inhibitor can be added. Suitable hydration inhibitors include a hydration inhibitor comprising pentasodium di-ethylene-triamine-penta-acetate. At least in some embodiments pentasodium di-ethylene-triamine-penta-acetate can be used in combination with sodium glycolate, sodium hydroxide and trisodium nitrilotriacetate. Suitable hydration inhibitors include a formulation with pentasodium di-ethylene-triamine-penta-acetate available under the trade name NO-GO Hydration (United States Gypsum Company, Chicago, Ill.), the use of which in gypsum slurries was disclosed in U.S. Pat. No. 8,343,273 incorporated herein by reference as a whole. A hydration retarder can be used in different amounts. At least in some embodiments, it is used in the range from 0.1 to 5%.

At least in some embodiments, an ultra-light cementitious composition may further comprise fibers. Such fibers may include organic fibers, inorganic fibers and a combination thereof. Suitable fibers may include fiberglass fibers, acrylic fibers, cellulose fiber and polypropylene fibers or a combination thereof.

In some embodiments, an ultra-light cementitious composition comprises dry and liquid components. Dry components can be premixed and stored on the shelf as a dry powder composition until this composition is transported to a work site where the composition is mixed with water and other liquid components. A pourable mix of the types described is useful for applications where light weight, faster than normal drying and controllable expansion are desired with controllable working and setting times. The mixes have uniquely high strengths at the various densities while they are wet as well as fully dried. The early strengths allow faster turnover and/or serviceability depending on the designed application.

Table 2 provides a dry powder composition suitable in various embodiments for an ultra-light cementitious composition.

TABLE 2

| Component | % Range by Weight |
| --- | --- |
| Cement | Used in the 50:50 ratio, |
| Calcium Sulfate Hemi-hydrate | with the sum total for both components 60-80% |
| Superplasticizer | 0.25-0.60% |
| Filler | 1-5% |
| Fibers | 0.025-0.050% |
| Hydration Reaction Accelerator | 0.01-0.03% |
| Hydration Reaction Retarder | 0.25-0.75% |

In some embodiments, a dry powder composition can be formulated as provided in Table 3.

TABLE 3

| Component | % Range by Weight |
| --- | --- |
| Cement | Used in the 50:50 ratio |
| Calcium Sulfate Hemi-hydrate | with the sum total for both components of 60-80% |
| Polycarboxylate Superplasticizer | 0.25-0.60% |
| EPS balls | 1-5% |
| Polypropylene Fibers | 0.025-0.050% |
| Hydration Reaction Accelerator | 0.01-0.03% |
| Hydration Reaction Retarder | 0.25-0.75% |

In some embodiments, a dry powder composition can be formulated as provided in Table 3A.

TABLE 3A

| Component | % Range by Weight |
| --- | --- |
| Cement | Used in the 50:50 ratio with the |
| Calcium Sulfate Hemi-hydrate | sum total for both components of 60-80% |
| Polycarboxylate superplasticizer | 0.25-0.60% |
| Expanded Perlite | 1-20% |
| Polypropylene Fibers | 0.025-0.050% |
| Hydration Reaction Accelerator | 0.01-0.03% |
| Hydration Reaction Retarder | 0.25-0.75% |

In some embodiments, a dry powder composition can be formulated as provided in Table 3B.

TABLE 3B

| Component | % Range by Weight |
| --- | --- |
| Cement | Used in the 50:50 ratio with the |
| Calcium Sulfate Hemi-hydrate | sum total for both components of 60-80% |
| Polycarboxylate superplasticizer | 0.25-0.60% |
| Treated Perlite | 1-20% |
| EPS Balls | 1-5% |
| Polypropylene Fibers | 0.025-0.050% |
| Hydration Reaction Accelerator | 0.01-0.03% |
| Hydration Reaction Retarder | 0.25-0.75% |

A composition that comprises liquid components for an ultra-light cementitious composition can be prepared either directly at a work site or it can be prepared in advance and transported to a work site as needed.

Table 4 provides a liquid composition which is suitable for use with a dry powder composition of Tables 2, 3, 3A and 3B as well as in other embodiments with light-weight fillers including, but not limited to, those in which EPS balls, expanded perlite, (treated or untreated) and/or a combination of the same are used. The treated perlite is generally coated with a siloxane or similar type coating to make it hydrophobic in nature so as not to absorb water from the mix.

TABLE 4

| Component | By Weight Parts |
| --- | --- |
| Water | 4-6 |
| Anionic/Nonionic Surfactant mixture of Table 1 | 0.1-0.25 |
| NoGo Hydration Inhibitor | 0.1-0.5 |

At least in some embodiments, an ultra-light cementitious composition comprises a 50:50 mixture of cement and calcium hem i-hydrate, a filler and an anionic/nonionic surfactant mixture. In further embodiments, the composition further comprises at least one of the following: a superplasticizer, fibers, a set accelerator, a set retarder and a hydration inhibitor. At least in some embodiments, a filler is EPS balls, expanded perlite, treated or untreated perlite and/or a combination and an anionic/nonionic surfactant mixture is a mixture as defined in Table 1. At least in some embodiments, a surfactant mixture is DAWN. At least in some preferred embodiments, a surfactant mixture is DAWN ULTRA. At least in some embodiments, a superplasticizer is a polycarboxylate.

At least in some embodiments, an ultra-light cementitious composition may comprise components as provided in Table 5.

TABLE 5

| Component | % By Weight |
| --- | --- |
| Cement/Calcium Sulfate Hemi-hydrate 50:50 mixture | 60-80% |
| Filler | 1-25% |
| Anionic/Nonionic Surfactant Mixture | 0.1-5% |
| Superplasticizer | 0.1-1% |
| Other components in various amounts | Up to 100% |

Other components may include at least one of the following: fibers, such as for example polypropylene fibers; a hydration inhibitor, such as for example NoGo hydration inhibitor; water, a set inhibitor, such as for example Sodate; and a set accelerator, such as for example HRA or CSA accelerator.

Unexpectedly, an ultra-light cementitious composition comprising the components of Table 5 was fast setting and exhibited excellent compressive strength between 20 to 30 psi when measured 1-3 hours post setting. Compressive strength can be measured with a compressive strength machine which subjects a sample to compressive pressure until the sample breaks. Compressive strength is then calculated based on the amount of pressure to be applied until the sample breaks.

The composition also exhibited excellent compressive strength of 75-230 psi after it dried completely. Also unexpectedly, the composition achieved even distribution of filler particles and the particles did not shift significantly in the cementitious matrix during setting. Thus, the wet density was 20-40 pounds per square foot and the dry density was 18-38 pounds per square foot. These and other unexpected properties achieved with an ultra-light cementitious composition are further described in Table 6.

TABLE 6

| WET DENSITY: lbs/FT$^3$ | 20-40 lbs/ft$^3$ |
| --- | --- |
| DRY DENSITY: lbs/FT$^3$ | 18-38 lbs/ft$^3$ |
| SLUMP 2" × 4": inches | 3-7" |
| 50 g Lime Vicat set: min | 20-50 min |
| 300 g Vicat Set: min | 30-90 min |
| 1-3 hour compressive strength: psi | 10-30 psi |
| Dry Compressive Strength: psi | 10-100 psi |

Various methods can be used to prepare an ultra-light cementitious composition. For example, all dry components can be preblended and provided in a package. Alternatively, all components including a surfactant mixture and water can be provided in the same mixture. At least in some embodiments, a bucket mixing with a drill and a rubber disk can be used. In this method, a rubber disk is used to form foam by mixing water with an anionic/non-ionic surfactant mixture. After the foam is generated, other components such as cement and calcium sulfate hemi-hydrate are added, and the mixture is blended together in a mixer until the resulting slurry is smooth and creamy. A filler, such as for example EPS balls, is then added to the slurry and mixed.

Various poured products such as doors, garage door panels, wall partition systems, ceiling panels, gun safes, file cabinets and other fire rated applications can be prepared with an ultra-light cementitious composition. Such products as doors, partitions and panels can be prepared at a manufacturing facility and then shipped to a construction site. At least in some embodiments, poured products, such as for example flooring and wall partitions can be poured directly at a building construction site.

At least in some methods, a poured product is obtained by pouring an ultra-light cementitious composition onto a substrate. Such substrate may include at least one mat on top of which an ultra-light cementitious composition is poured. In some embodiments, a pourable product is obtained by pouring an ultra-light cementitious composition onto one piece of a substrate and then covering the poured composition with another piece of a substrate. Various substrates can be used, including without limitation, paper, wood, plywood, oriented strand board (osb), glass fiber mats, plastic mats and metal plates.

In other embodiments, an ultra-light cementitious composition can be poured into a cast or mold or frame. This method is suitable for example for preparing wall partitions. A cast can be made of wood, plywood, plastic, metal and any other material commonly used in construction. A cast can be removed after the composition sets. In other embodiments, a cast can be designed such that it stays as a part of a finished poured product.

In some embodiments, an ultra-light cementitious composition can be used as a self-drying deep fill material which can be poured or pumped as a flooring composition onto a substrate. As shown in the FIGURE, at least in some embodiments self-leveling flooring (generally, 10) is created by preparing an ultra-light composition as described in this application and pumped or poured onto a substrate (12). This creates a first cementitious layer (14) which is up to about 5 to 6 inches in thickness. A second cementitious composition with higher compressive strength can then be prepared and poured over the first layer (14) and creates a second layer or capper (16) which is about 1 to 3.8 inches in thickness.

In some embodiments the first layer (14) and the second layer (16) are both prepared from ultra-light compositions. In other embodiments, only the first layer (14) is made with an ultra-light cementitious composition.

Further embodiments provide ultra-light cementitious compositions and methods in which slurries are prepared with a very low amount of water or in other words with low water demand. The water demand is defined as the total weight of the water divided by the weight of the dry components. Such ultra-light cementitious compositions include those in which the ratio of water to dry components is in the range from 0.17 to 0.30. These ultra-light cementitious compositions are advantageous over conventional compositions in which the ratio of water to dry components can be 0.40 to 1.0 before a smooth and workable slurry can be achieved.

The unexpected super self-leveling nature of an ultra-light cementitious composition at the ultra low consistency with the positive expansion lends the formulation for use as a material without other additives which is useful for self leveling flooring and solid castings where high strength is needed. This formulation can be poured in a uniquely thin ribbon into very small openings and self levels without the aid of conventional smoothing or vibrating devices.

The uniqueness of the ultra-low water demand provides the ability of the blend to be mixed uniquely with light weight materials and/or foam providing for a final hardened matrix which does not contain or contains minimal excess water. Therefore, there is no need to dry this water by heat or force it out by mechanical means. This allows for higher early strengths of the resulting product and the ability for the product to be serviceable much earlier than conventional formulations. The combination of the viscosity control aides and the described levels of water provide for unique ability to control the light weight additives such that they are uniform within the resultant cast (pumped or poured) material.

The invention will be further explained by the way of the following non-limiting examples.

Example 1

Pourable Ultra-Light Cementitious Composition

The following dry components were mixed together in proportions provided in Table 7 below.

TABLE 7

| Component | % By Weight | By Weight (lbs) |
|---|---|---|
| Cement: Class C, Type II or Type V Portland Cements | 48.78% | 10 |
| HYDROCAL ® C-Base Calcium Alpha Hemi-hydrate | 48.78% | 10 |
| Inhibitor: (Sodate) | 0.48% | 0-0.2 (typical 0.1) |
| PCE: (Melflux 2641F. 1641F and/or 6681) | 0.37% | 0.25-0.15 0.26 (typical 0.27-0.075) |
| Light Weight Filler: EPS Balls | 1.61% | 3.0-5.0 gal (150-300 g) (0.33-0.66) |

TABLE 7-continued

| Component | % By Weight | By Weight (lbs) |
|---|---|---|
| HRA or CSA accelerator | 0.012% | 0-0.005 (typical 0.0025) (7-21 g) |
| Polypropylene Fibers | 0.039% | 0.0008-0.0024 |
| TYPICAL TOTAL: | 100.07% | 20.50 pounds |

The following liquid components were mixed together in the ratios provided below:

TABLE 8

| Component | By Weight |
|---|---|
| Water | 4.0-6.0 lbs |
| Dawn Blue (typically Ultra) | 0-0.25 lbs (Typically 0.1 lbs) |
| NoGo Hydration Inhibitor | 0-0.5 ounces |

An ultra-light cementitious composition was obtained by preblending cement, calcium alpha hem i-hydrate, sodate, PCE, and HRA or CSA accelerator. In an alternative embodiment, all dry components, including EPS balls and polypropylene fibers were preblended. In another embodiment, all the dry components including expanded perlite and polypropylene fibers are preblended.

Water was measured out to the nearest 0.1 pounds in the appropriate sized mixing vessel. For the 20.5 lbs mix, a 6 gallon pail was used. DAWN BLUE surfactant, NOGO hydration inhibitor, and polypropylene fibers were weighed and added to the water and mixed with a spatula or by mechanical mixing (lightly).

A drill (rpm 1000-1750) was used with a rubber disk, approximately ⅓ to ½ the diameter as the mixing vessel. The drill was engaged and the mix was started near the bottom and moving upward slowly to develop the foam. The mix was approximately ½ to ⅔ of the volume of the mixing vessel at this point. Approximately 30-45 seconds of mixing was needed.

The preblended dry mixture of cement, calcium alpha hem i-hydrate, PCE, HRA (or CSA) and sodate was then added to the mixer. After approximately 1 minute, the mixture was smooth and creamy.

The EPS balls were added in 1 gallon or ½ gallon increments until the desired density was achieved. In between additions, the slurry was mixed to properly incorporate the EPS balls. Unexpectedly, it was observed that the foam, in conjunction with the controlled viscosity of the mix at ultra low water, stabilized the EPS balls while the foam was stable in the presence of the PCE.

For the 6 gallon pail, the density was in the range of 25-35 lbs/cubic foot typically when the pail mix volume was 1" or less from the top.

After the final mixing and incorporation, the mix was ready for pouring panels, floor samples and/or door core but not limited to the same.

The final composition of the slurry was as shown in Table 9 below:

TABLE 9

| Component | % By Weight | % | By Weight |
|---|---|---|---|
| 1. Cement: Class C, Type II or Type V Portland Cements for example | 8.3% | 3 | 10 lbs |
| 2. Gypsum: (HYDROCAL ® C-Base for example) | 8.3% | 3 | 10 lbs |

TABLE 9-continued

| Component | % By Weight | % | By Weight |
|---|---|---|---|
| 3. Inhibitor: (Sodate for example) | 0.38% | 0 | 0-0.2 lbs (typical 0.1 lbs) |
| 4. PCE: (Melflux 2641F, 1641F and/or 6681 for example) | 0.29% | 0 | 0.15 lbs (typical 0.075 lbs) |
| 5. Light Weight Filler: EPS Balls form example | 0.26% | 1 | 3.0-5.0 gal (150-300 g) (0.33-0.66 lbs) |
| 6. HRA or CSA accelerator | 0.01% | | 0-0.005 lbs (typical 0.0025 lbs) |
| 7. Polypropylene Fibers | 0.03% | | (7-21 g) 0.0008-0.0024 lbs |
| Water | 21% | | 4.0-6.0 lbs (5.5 lbs) |
| Dawn Blue (typically Ultra) | 0.38% | | 0-0.25 lbs (Typically 0.1 lbs) |
| NoGo Hydration Inhibitor | 0 | | 0-0.5 ounces (0) |
| TYPICAL TOTAL: | 99.95% | | 26.1 pounds |

Alternatively, ingredients can be blended by mechanical mixing with a STRONG MANUFACTURING Super 80 but not limited to the same. In this method, water is measured and added to a mixing chamber with the mixer turning. Optionally, NOGO hydration inhibitor can be added to the water in order to extend working time. The dry materials are added to the mixer while the mixing blade assembly is engaged and rotating. The foam is either mechanically generated or can be generated with a disk in bucket. In alternative, the foam could be effectively injected into the pumping line prior to exit of hose.

This method provides a very uniform density, faster productivity with the following physical properties observed.

TABLE 9A

| | |
|---|---|
| WET DENSITY: lbs/FT$^3$ | 20-40 lbs/ft$^3$ |
| DRY DENSITY: lbs/FT$^3$ | 18-38 lbs/ft$^3$ |
| SLUMP 2" × 4": inches | 3-7" |
| Dry Compressive Strength: psi | 70-230 psi |

Example 2

Physical Properties of a Pourable Ultra-Light Cementitious Composition

An ultra-light cementitious composition was prepared as described in Example 1 and it was allowed to set. Surprisingly, the composition provided excellent compressive strength after it completely dried. Further and also unexpectedly, the dry density of the composition did not change significantly during setting, which was indicative of even distribution of EPS balls and very minimal shifting of the EPS balls as well as the unexpected low evaporation. See Table 6.

Example 3

Comparative Physical Properties of Pourable Ultra-Light Cementitious Compositions A composition with a 50:50 ratio of cement and calcium hemi-hydrate was prepared as provided in Table 10 below.

TABLE 10

Ultra Light Cementitious Dry Blend

| Additives | Amount |
|---|---|
| Calcium sulfate alpha hemi-hydrate | 2000 lbs |
| Cement (Class "C" Cement) raw | 2000 lbs |
| Accelerator (CSA) | 0.5 lbs |
| Plasticizer (Melflux 1641) | 15 lbs |
| Retarder (Sodate) | 20 lbs |
| TOTAL | 4030.5 lbs |

The mixture was then mixed with water at ratios of 0.17 to 0.30 water to dry blend ratio. A pourable slurry was then allowed to set and was examined for its compressive strength and other physical properties. As can be seen from Table 11, at the lowest consistency ranges the pourable slurry had water demands lower than theoretical or stoichiometric of either alpha calcium sulfate hemi-hydrate or cement or any combination thereof.

TABLE 11

Physical Characteristics of Dry Blend When Mixed at Ultra Low Water Demand (18 cc).

| | |
|---|---|
| Normal Consistency (cc) | 18 |
| Patty Diameter (in) | 4.44" |
| Hobart Vicat Set (min) | 24 |
| Wet Density (lbs/ftlbs) Average | 139.22 |
| One hour Wet Density (lbs/ft3) Average | 137.89 |
| One Hour Compressive Strengths (psi) | 4975 |
| Dry Density (lbs/ft$^3$) | 131.98 |
| Dry Compressive Strengths (lbs/ft$^3$) | >14,250* |

*Cubes would not break at the maximum capacity of the strength testing unit. Testing halted at 14,250 psi.

Alternatively, an ultra-light cementitious dry blend can be prepared as provided in Table 11A.

TABLE 11A

Alternative Ultra-Light Cementitious Dry Blend

| Additives | Amount |
|---|---|
| Calcium sulfate alpha hemi-hydrate | 2000 lbs |
| Cement (Class "C" Cement) raw | 2000 lbs |
| Accelerator (CSA) | 0.5 lbs |
| Plasticizer (Melflux 2641) | 15 lbs |
| Retarder (Sodate) | 15 lbs |
| TOTAL | 4030.5 lbs |

The mixture was then mixed with water at ratios of 0.17 to 0.30 water to dry blend ratio. A pourable slurry was then allowed to set and was examined for its compressive strength and other physical properties. At the lowest consistency ranges the pourable slurry had water demands lower than theoretical or stoichiometric of either alpha calcium sulfate hemi-hydrate or cement or any combination thereof.

TABLE 11B

Physical Characteristics of Dry Blend from Table 11A When Mixed at Ultra Low Water Demand (17cc)

| | |
|---|---|
| Normal Consistency (cc) | 17 |
| Patty Diameter (in) | 4.625" |
| Hobart Vicat Set (min) | 14 |

TABLE 11B-continued

Physical Characteristics of Dry Blend from Table 11A When Mixed at Ultra Low Water Demand (17cc)

| | |
|---|---|
| Wet Density (lbs/ftlbs) Average | 139.68 |
| One hour Wet Density (lbs/ft3) Average | 138.54 |
| One Hour Compressive Strengths (psi) | 4875 |
| Dry Density (lbs/ft$^3$) | 134.15 |
| Dry Compressive Strengths (lbs/ft$^3$) | >14,250* |

*Cubes would not break at the maximum capacity of the strength testing unit. Testing halted at 14,250 psi.

The hardened mix exhibited an unexpected positive expansion starting at 0.013% in 1 hour after set to a maximum of 0.022% and a 24 hr expansion maintained at 0.05%.

The uniqueness of the ultra-low water demand is the ability of the described above dry blends to be mixed uniquely with light weight materials and/or foam providing for a final hardened matrix which can have the potential with some designs to not contain excess water which must traditionally be dried out by heat or forced out by mechanical means. This allows for higher early strengths of the material and the ability for the product to be serviceable much more quickly than conventional formulations.

An ultra-light composition with a dry surfactant preblend mixture was prepared as shown below:

| | |
|---|---|
| HYDROCAL B-Base (calcium sulfate hemi-hydrate) | 108 lbs |
| Rhodacal BX-78 (surfactant) | 27 lbs |
| Calsoft F-90 (surfactant) | 53.5 lbs |
| DAXAD 19 (sulfonated Napthalene) | 13.5 lbs |
| TOTAL: | 202 lbs |

This surfactant dry pre-mix was used in conjunction with the dry mix formula from Table 7 in the proportion of 400 g: 1.82 g surfactant dry pre-mix respectively and sifted into 96 g (ml) of water. The mix was foamed up utilizing a Hamilton Beach Mixer model # HMD200 at 13,000 to 14,000 rmp (speed 2) for one minute then another minute at 18,500 rmp (speed 3) with a 1.5 inch rubber disk.

The mixture was allowed to set and its physical properties were as follows:

TABLE 12

Physical Characteristics of the Mix:

| | |
|---|---|
| Water Usage: (g) | 96 |
| Water Demand used: | 0.24 |
| Water to Powder Ratio | |
| Wet Weight: (g) | 461.45 |
| Wet Density: (lbs/ft$^3$) | 102.76 |
| 50 Lime Vicat Set: (min) | 33 |
| 300 g Vicat Set: (min) | 56 |

Alternately, utilizing the same mix design with an increase in the surfactant premix made to 3.64 g, when the speed of the mixing is modified so that the high speed only of 17500-18000 rpm is used with the 1½" rubber disk for 3 minutes only, all else being done the same the results are as follows:

TABLE 13

Physical Characteristics of the Mix: (modified mix speed and time)

| | |
|---|---|
| Water Usage: (g) | 96 |
| Water Demand used: | 0.24 |
| Water to Powder Ratio | |
| Wet Weight: (g) | 284.95 |
| Wet Density: (lbs/ft$^3$) | 61.91 |
| 50 Lime Vicat Set: (min) | 37 |
| 300 g Vicat Set: (min) | 58 |

The vicat sets were unexpectedly not changed significantly although the densities were dramatically reduced, still at a water demand expected to self consume its moisture.

This method demonstrates the usefulness of formulations containing a dry surfactant pre-mix blend, which would not necessarily require the pre-generation of foam for a useful ultra light composition. The method also employs the use of the sodate retarder, but could include a combination of inhibitor technologies depending on the need of the invention. This method demonstrated the usefulness of the high molecular weight Melflux 1641, polycarboxlyate ether technology, but not limited to the same. A liquid PCE is useful for ultra-light cementitious compositions as well.

In some embodiments, the same mixing method can be used with a liquid DAWN ULTRA surfactant in place of the dry surfactant premix as described in detail below.

In the mixing method, the following steps are performed:
1. DAWN ULTRA surfactant is added to water and stirred to blend lightly
2. Sift in the dry ingredients and allow them to soak for 1 minute
3. Mix on the Hamilton Beach Malt Mixer at speed 2 (medium speed) 2 minute
4. Mix on the Hamilton Beach Malt Mixer at Speed 3 (high speed) 1 minute
5. Pour the resultant slurry in the density cup for wet density
6. Pour some of the slurry in a waxed cup for vicat set testing

TABLE 14

Use of liquid surfactant (Dawn Ultra) for density control

| | |
|---|---|
| Water Usage: (g) | 96 |
| Water Demand used: | 0.24 |
| Water to Powder Ratio | |
| Dawn Ultra: (g) | 2 |
| Wet Weight: (g) | 383 |
| Wet Density: (lbs/ft$^3$) | 84.62 |
| 50 Lime Vicat Set: (min) | 37 |
| 300 g Vicat Set: (min) | 58 |

The density of the mix and changing of the surfactant to a liquid did not alter the setting action significantly. The water usage maintained with the parameters for a self-consuming water or self-drying technology for light-weight panel production.

In the following embodiment EPS balls were added. The mixing method was performed as follows.
1. Weigh the water to the nearest 0.1 g in a malt cup
2. Weigh out the Dawn Ultra (2 g) to the nearest 0.1 g
3. Add the Dawn Ultra to the water and stir to blend lightly
4. Add 5 grams of EPS balls to the weigh pan and blend into the 400 grams of dry ultra light weight blend.
5. Sift in the dry ingredients and allow them to soak for 1 minute 6. Mix on the Hamilton Beach Malt Mixer at speed 2 (medium speed) 2 minute
7. Pour the resultant slurry in the density cup for wet density
8. Pour some of the slurry in a waxed cup for vicat set testing
9. Pour slurry into 2"×2" brass cube molds for additional density and compressive strength testing.

The use of the EPS (STYROFOAM) balls in the mixture dramatically improved the density of the mixture without substantial impact on the setting action of the matrix.

TABLE 15

Use of liquid surfactant (Dawn Ultra) for density control

| | |
|---|---|
| Water Usage: (g) | 96 |
| Water Demand used: Water to Powder Ratio | 0.24 |
| Dawn Ultra: (g) | 2 |
| EPS balls: (g) | 5 |
| Wet Weight: (g) | 209.60 |
| Wet Density: (lbs/ft³) | 44.55 |
| 50 Lime Vicat Set: (min) | 37 |
| 300 g Vicat Set: (min) | 57 |

TABLE 16

| Water To Power Ratio: | Wet Density (lbs/ft³) Average | 1 hour Wet Density (lbs/ft³) Average | 1 Hour Compressive Strengths (psi) |
|---|---|---|---|
| 0.245* | 42.56-45.3 | 39.94-42.47 | 350-385 |

*Note: assuming the liquid Dawn Ultra contains water as its greatest ingredient, the maximum impact on water to powder ratio could be 0.05.

The key factors in the formulation are the use of the air from the foam created to stabilize the EPS balls at an ultra low water demand, while maintaining set control and with compressive strengths greater than or equal to 350 psi 1 hour after vicat set, meaning the cast panel or floor or partition panel would be able to be serviceable early with respect to the intended use.

Example 4

An Ultra-Light Composition with Borosilicate Glass Bubbles (3M 37HS)

The following composition was prepared with Borosilicate glass bubbles.

TABLE 17

| Component | % By Weight | % By Weight | |
|---|---|---|---|
| 1. Cement: Class C, Type II or Type V Portland Cements for example | 8.3% | 3 | 10 lbs |
| 2. Gypsum: (HYDROCAL ® C-Base for example) | 8.3% | 3 | 10 lbs |
| 3. Inhibitor: (Sodate for example) | 0.38% | 0 | 0-0.2 lbs (typical 0.1 lbs) |
| 4. PCE: (Melflux 2641F. 1641F and/or 6681 for example) | 0.29% | 0 | 0.15 lbs (typical 0.075 lbs) |
| 5. Light Weight Filler: BOROSILICATE BUBBLES (3M 37HS for example) | 0.26% | 1 | 3.0-5.0 gal (150-300 g) (0.33-0.66 lbs) |
| 6. HRA or CSA accelerator | 0.01% | | 0-0.005 lbs (typical 0.0025 lbs) |
| 7. Polypropylene Fibers | 0.03% | | (7-21 g) −0.0008-0.0024 lbs |
| Water | 21% | | 4.0-6.0 lbs (5.5 lbs) |
| Dawn Blue (typically Ultra) | 0-0.38% | | 0-0.25 lbs (typically 0.1 lbs) |
| NoGo Hydration Inhibitor | 0 | | 0-0.5 ounces (0) |
| TYPICAL TOTAL: | 99.95% | | 26.1 pounds |

Uniquely, the density of this pourable ultra light weight slurry was similar to foamable plaster. However, the foamable plaster requires a much higher amount of water to achieve a similar density. Specifically, while a water to powder ratio for the pourable ultra light weight slurry was 0.24 as shown in Table 15, a water to powder ratio for the foamable plaster was 1.0. The parameters for this type of formula also utilized a similar method of mixing on the malt mixer with the rubber disk at an RPM on low speed of approximately 13000-14000 rpm.

This type of mixture could prove useful for the casting of non-ferrous metals as an alternative use with much higher green strengths than typical slurries of this density in the wet state. Table 16 discloses physical characteristics of foamed dry blend when EPS and DAWN ULTRA are used together with mechanical foaming.

Physical properties of the resulting slurry are shown in Table 18 below.

TABLE 18

| | |
|---|---|
| Dry Blend: (g) | 1000 |
| Water Usage: (g) | 520-600 |
| Water Demand used: Water to Powder Ratio | 0.416-0.48 |
| Borosilicate glass bubbles: (g) | 250 |
| Dawn Ultra: (g) | 0 |
| Wet Density: (lbs/ft³) | 58.45-65.59 |
| Dry Density: (lbs/ft³) | 45.49-47.60 |
| 1 hour Compressive Strength: (psi) | 133-185 |
| Dry Compressive Strength: (psi) | 1092-1200 |
| % expansion: 1 hour after set | 0.01% |
| % expansion: 24 hour after set | 0.002% |
| Hobart Mix: 300 g Vicat Set: (min) | 58 |

Unexpectedly, the higher water demand resulted in higher strengths of the wet hardened and dry hardened material. Further, when a filler is removed completely and the described foam is used with the dry blend at the ultra low water demand to control the density, the resultant slurry is a controllable, higher density mix with considerably higher strength than expected. The formula lends itself more resistance to heat while providing a material suitable for a wide variety of applications including, but not limited to, light weight deep self dry flooring, gun and safe filler materials as well as pourable wall panels and related assemblies. As a pourable light weight flooring material, it lends itself to controllable working times with the use of inhibitors, and high enough strengths to be serviceable as is or as a deep fill product which can be later capped with a higher compressive strength material.

The following ultra-light cementitious composition was prepared as shown in table 19.

TABLE 19

| Component | % By Weight | By Weight |
|---|---|---|
| 1. Cement: Class C, Type II or Type V Portland Cements for example | 8.3% | 10 lbs |
| 2. Gypsum: (HYDROCAL ® C-Base for example) | 8.3% | 10 lbs |
| 3. Inhibitor: (Sodate for example) | 0.38% | 0-0.2 lbs (typical 0.1 lbs) |
| 4. PCE: (Melflux 2641F. 1641F and/or 6681 for example) | 0.29% | 0.15 lbs (typical 0.075 lbs) |
| 6. HRA or CSA accelerator | 0.01% | 0-0.005 lbs (typical 0.0025 lbs) |
| 7. Polypropylene Fibers | 0.03% | (7-21 g) −0.0008-0.0024 lbs |
| Water | 21% | 4.0-6.0 lbs (5.5 lbs) |
| Dawn Blue (typically Ultra) | 0-0.38% | 0-0.25 lbs (Typically 0.1 lbs) |
| NoGo Hydration Inhibitor | 0 | 0-0.5 ounces (0) |
| TYPICAL TOTAL: | 99.95% | 26.1 pounds |

The mixture of table 19 was prepared by the Hamilton Beach Mixer method at 18,550 rpm for 3 minutes. The following physical properties were achieved and shown in Table 20 below:

TABLE 20

| | |
|---|---|
| Dry Blend: (g) | 400 |
| Water Usage: (g) | 96 |
| Water Demand used: Water to Powder Ratio | 0.245 |
| Dawn Ultra: (g) | 2 |
| Wet Density: (lbs/ft$^3$) | 71.96-78.22 |
| 50 g Lime Vicat Set: (min) | 25-41 |
| 300 g Vicat set: (min) | 57-74 |
| Slump 2″ × 4″ (in) | 6-6.38 |
| Dry Density: (lbs/ft$^3$) | 67.48-73.40 |
| Dry Compressive Strength: (psi) | 1425-1800 |

Alternatively, when using the high volume self-contained SUPER 80 or similar mixing and pumping unit, the results of a foamed slurry at ultra-low water demand were as follows:

TABLE 21

| | |
|---|---|
| Dry Blend: (lbs) | 150 |
| Water Usage: (lbs) | 33 |
| Water Demand used: Water to Powder Ratio | 0.22 (3.95 to 4.0 gallons) |
| NOGO Hydration Inhibitor: (oz) | 10 |
| Foam Density: | 3 lbs/ft$^3$ |
| Foam Generated | Liquid mix Table 1 |
| Wet Density: (lbs/ft$^3$) | 62.34-65.33 |
| Dry Density: (lbs/ft$^3$) | 60.02-62.84 |
| Dry Compressive Strength: (psi) | 1425-1800 |

At ultra low water demand, the slurry from the mix was unexpectedly very easy to mix, pump and had a self leveling tendency. The resultant strengths were surprisingly similar to those from the smaller mix. These mixtures can be easily scaled up to a much higher production volume. It is expected within the scope of this invention that the density could be further controlled to achieve desired properties.

Example 5

Alternative Ultra-Light Cementitious Composition

An alternative ultra-light cementitious composition was prepared with white cement as provided in Table 22.

TABLE 22

| Component | % By Weight | By Weight |
|---|---|---|
| 1. White Portland cement meeting type V specifications or within 0-7% C3A at a maximum; such as but not limited to AABORG Type V White Cement | 24.76 | 500-2000 lbs (preferred 750-1750 lbs; optimum 1000 lbs) |
| 2. Gypsum: (HYDROCAL ® C-Base for example) but not limited to the same. Alpha and or alpha beta blends would be acceptable alternatives. C-Base preferred | 74.29 | 2000-3500 lbs (preferred 2250-3250 lbs); optimum 3000 lbs |
| 3. Potassium Sulfate: as needed to modify set and expansion | 0.24 | 0-30 lbs; Typical range 5-15 lbs; for example 10 lbs |
| 4. PCE: (Melflux 2641F. 1641F and/or 6681 for example) | 0.29% | 1-30 lbs; (preferred 5-15 lbs) for example 12 lbs |
| 6. Aluminum Sulfate; to adjust set time | 0.07 | 0-30 lbs; Typical range 0-10 lbs; for example 3 lbs |
| 7. LVR Stabilizer Premix; Diutan Gum | 0.012 | 0-5 lbs; preferred 0-2 lbs; for example 0.5 lbs |
| 8. Vinapor DF 9010F defoamer, but not limited to the same. | 0.07 | 0-10 lbs; preferred 0-3 lbs; example 3 lbs |
| 9. Sodate Retarder but not limited to the same. Set control | 0.24 | 0-30 lbs; preferred 0-20 lbs; for example 10 lbs |
| TYPICAL TOTAL: | 99.972 | 4038.5 |

The mixture was then mixed with water at ratios of 0.18 to 0.22 water to dry blend ratio. A pourable slurry was allowed to set and was examined for its compressive strength and other physical properties. At the lowest consistency ranges (low water demand, 18 and 22 cc), the pourable slurry had water demands lower than theoretical or stoichiometric of either alpha calcium sulfate hem i-hydrate or cement or any combination thereof. Physical properties of this mix are shown in Table 23 below.

TABLE 23

| | | |
|---|---|---|
| Normal Consistency (cc) | 18 | 22 |
| Patty Diameter (in) | 3 | 4.25 |
| Hobart Vicat Set (min) | 18 | 18 |
| Wet Density (lbs/ft$^3$) Average | — | 132.55 |
| 2 Hour Compressive Strengths (psi) | — | 6500 |
| 24 Hour Density (lbs/ft$^3$) | — | 127.05 |
| 24 Hour compressive strengths (psi) | — | 8817 |
| Dry Density (lbs/ft$^3$) | 132.90 | 129.85 |
| Dry Compressive Strengths (lbs/ft$^3$) | >14,250* | >14,250* |
| Maximum Expansion (%) | — | 0.0585 |
| Temperature Rise (deg ° F.) and Maximum Rate of Rise (deg ° F. per min max) | 43 deg F/9.26 deg F/min | 39 deg F/6.0 deg F/min |
| Monotron Surface Hardness: Kg load for 0.1" penetration of 10 mm ball | 290 | 242 |

*Cubes would not break at the maximum capacity of the strength testing unit. Testing halted at 14.250 psi.

The hardened mixture exhibited an unexpected positive expansion starting at 0.0435% in 2 hours after set to a maximum of 0.0585% and a 24 hr expansion maintained at 0.047%. The surface hardness of the hardened mix when dried was unexpectedly hard and would provide for a very serviceable and potentially self-drying, ware surface. When the mix flowability was measured with various slump cylinders the following results were obtained.

TABLE 24

HOBART MIXING WITH VARIOUS SLUMP CYLINDER SIZES

| Normal Consistency (cc) | Patty Diameter (in) 1" × 2" SLUMP | Patty Diameter (in) 2" × 4"" SLUMP) |
|---|---|---|
| 22 | 7.13 | 12.88 |

An ultra-light formulation with less than 50% Portland cement and perlite was prepared as provided in Table 25.

TABLE 25

| Component | % By Weight | By Weight |
|---|---|---|
| 1. White Portland cement meeting type V specifications or within 0-7% C3A at a maximum; such as but not limited to AABORG Type V White Cement | 67.59 | 500-2000 lbs (preferred 750-1750 lbs; optimum 1000 lbs) |
| 2. Gypsum: (HYDROCAL ® C-Base for example) but not limited to the same. Alpha and or alpha beta blends would be acceptable alternatives. C-Base preferred | 22.53 | 2000-3500 lbs (preferred 2250-3250 lbs); optimum 3000 lbs |
| 3. Potassium Sulfate: as needed to modify set and expansion | 0.225 | 0-30 lbs; Typical range 5-15 lbs; for example 10 lbs |
| 4. PCE: (Melflux 2641F. 1641F and/or 6681 for example) | 0.27 | 1-30 lbs; (preferred 5-15 lbs) for example 12 lbs |
| 5. Aluminum Sulfate; to adjust set time | 0.068 | 0-30 lbs; Typical range 0-10 lbs; for example 3 lbs |
| 6. LVR Stabilizer Premix; Diutan Gum | 0.011 | 0-5 lbs; preferred 0-2 lbs; for example 0.5 lbs |
| 7. Vinapor DF 9010F defoamer, but not limited to the same. | 0.068 | 0-10 lbs; preferred 0-3 lbs; example 3 lbs |
| 8. Sodate Retarder but not limited to the same. Set control | 0.225 | 0-30 lbs; preferred 0-20 lbs; for example 10 lbs |
| 9. UNTREATED PERLITE | 9 | 5-20%: preferred 7-15%; for example 400 lbs |
| TYPICAL TOTAL: | 99.987 | 4438.5 |

Depending on the end user needs, the percentage of perlite and other light weight components can be increased or decreased. When the dry formulation of Table 25 is mixed with water using the HOBART MIXER method on speed 2 with a 2 minute mix with the paddle, the makeup of the mix and the physical properties are as follows:

TABLE 26

Dry Blend with (−6 mesh) Perlite Mixed with Water

| | Weight (g) | Weight Percent (%) |
|---|---|---|
| DRY BLEND WITH UNTREATED (−6 MESH) PERLITE | 4438.5 | 80.65 |
| Water | 1065 | 19.35 |
| Total | 5503.74 | 100 |

The physical properties of the mixture are reported in Table 27.

TABLE 27

| Consistency (cc) | Patty Diameter (in) 1" × 2" slump | Patty Diameter (in) 2" × 4" slump | 300 Gram Vicat Set (min) | 2 hour Wet Density (lbs/ft$^3$) Average | 2 Hour Compressive Strengths (psi) | 24 Hour Density (lbs/ft$^3$) | 24 Hour compressive strengths (psi) | Dry Density (lbs/ft$^3$) | Dry Compressive Strengths (lbs/ft$^3$) |
|---|---|---|---|---|---|---|---|---|---|
| 24 (19.5 by weight percent) | 5.63 | 9.75 | 14 | 106.47 | 2758 | 105.2 | 3617 | 96.77 | 6142 |

With the mix design described, it was possible to successfully lower the density substantially while maintaining uniformity of the core of the hardened material while uniquely maintaining positive expansion almost the same as without the light weight, pushing the gypsum crystals farther apart. Typically increasing the spacing between crystals would be expected to reduce the expansion. No significant loss was detected in expansion with a 2 hour rate of 0.044%, a 24 hour rate of 0.047 and a maximum rate of 0.06 percent expansion.

The ultra-low water demand, unexpectedly high strengths, and superior flowability allow for ease of pouring without the need for drying. This formulation has a serviceable surface within several hours after pouring.

When the perlite used is treated perlite at the 9% addition rate and the water demand is adjusted to accommodate the fineness of the perlite, the resultant mix design with water is as follows:

TABLE 28

Dry Blend with Treated Perlite Mixed with Water

|  | Weight (g) | Weight Percent (%) |
|---|---|---|
| DRY BLEND WITH 35/34 Treated Perlite | 4438.5 | 68.49 |
| Water | 2041.7 | 31.51 |
| Total | 6480.2 | 100 |

When the formula of Table 28 is mixed with water using the HOBART MIXER method on speed 2 with a 2 minute mix with the paddle the makeup of the mix, the physical properties are as follows:

TABLE 29

| Consistency (cc) | Patty Diameter (in) 1" × 2" slump | Patty Diameter (in) 2" × 4" slump | 300 Gram Vicat Set (min) | 2 hour Wet Density (lbs/ft³) Average | 2 Hour Compressive Strengths (psi) | 24 Hour Density (lbs/ft³) | 24 Hour compressive strengths (psi) | Dry Density (lbs/ft³) | Dry Compressive Strengths (lbs/ft³) |
|---|---|---|---|---|---|---|---|---|---|
| 46 (31.51 by weight percent) | 5.5 | 9.69 | 36 | 71.06-71.25 | 500-550 | 63.34-65.37 | 700-825 | 56.76-56.97 | 1375-1425 |

The use of the treated perlite provides a mix with lighter weights while showing unique suspension of light weights due to the characteristics of the light weight treated perlite coupled with balanced water demand, unique flow aid blends and mix viscosity control. The unique positive expansion was maintained with the gypsum crystals being pushed further apart. The 2 hour expansion of 0.0495%, 24 hour of 0.053% and maximum expansion of 0.055% were uniquely similar to the starting mix at ultra low water demand with no light weight additives in the mix.

While particular embodiments have been shown and described, it will be appreciated by those skilled in the art that changes and modifications may be made thereto without departing from the invention in its broader aspects and as set forth in the following claims.

What is claimed is:

1. An ultra-light self-drying composition comprising calcium sulfate hemi-hydrate and cement, where the cement is a combination of white and gray cement at a ratio of calcium sulfate hemi-hydrate to the cement of 75% to 25% respectively, and wherein the composition further comprises at least one filler, wherein the filler includes one or more of the following: expanded coated perlite, expanded uncoated perlite, shale, borosilicate glass spheres, light weight fly ash, expanded polystyrene balls, or any combination thereof.

2. The composition of claim 1, wherein the filler includes the expanded coated perlite and/or the expanded uncoated perlite.

3. A self-drying product comprising the composition of claim 1.

4. The self-drying product of claim 3, wherein the product is selected from the group consisting of flooring, doors, wall panels, garage door panels, wall partition systems, ceiling panels, gun safes and file cabinets.

* * * * *